INVENTOR.
Alfred E. Smith

United States Patent Office 3,415,170
Patented Dec. 10, 1968

3,415,170
SEALING ARRANGEMENT FOR PISTON-
CYLINDER PRESSURE VESSEL
Alfred E. Smith, Clinton, Tenn., assignor to the United States of America as represented by the United States Atomic Energy Commission
Filed Sept. 21, 1966, Ser. No. 581,422
2 Claims. (Cl. 92—246)

The invention described herein was made in the course of, or under, a contract with the U.S. Atomic Energy Commission. It relates generally to sealing arrangements and more particularly to a sealing arrangement for a piston-cylinder type pressure vessel employed in isostatic hot pressing.

A problem long associated with high pressure piston-cylinder type pressure vessels has been that of providing a suitable seal between the movable piston and its matching cylindrical die member during a pressing operation. In addition to the difficulties created by the axial movement of the seal within a die, the annular spacing to be sealed between the moving parts increases with increasing pressure within the die.

One approach to the problem has been to provide sealing means which create an interference fit between the moving piston and the die member. A large interference is required where high pressures must be sealed against, however, in order to provide for the increase in annular clearance between the piston and die at pressure. At low pressures, where the annular clearance is smallest or non-existent, the interference fit dictated by high pressure clearance requirements is greatest even though the sealing requirements at low pressure are minimal. The large unneeded interference present at low pressure because of high pressure requirements is deleterious to operation of the pressure vessel in that large thrust forces must be applied to the piston in order to overcome the friction between it and the die. In addition, the contacting surfaces are subject to rapid wear with a correspondingly short useful lifetime.

Interference seals have also been subject to jamming, large thrust losses and withdrawal problems occasioned by the extrusion of seal material between the piston and die at high pressures. Extrusion of seal material between the piston and die is generally restricted to high pressure operation where the extrusion force and extrusion cross section (clearance between piston and die member) are greatest.

It is, accordingly, a general object of the invention to provide a sealing arrangement for a high-pressure, piston-cylinder type pressure vessel.

Another object of the invention is to provide a seal whose sealing capacity increases at increasing pressure.

Another object of the invention is to provide a seal which will not extrude between the piston and die at high pressure.

Other objects of the invention will be apparent from an examination of the following description of the invention and appended drawings, wherein.

Figure 1:
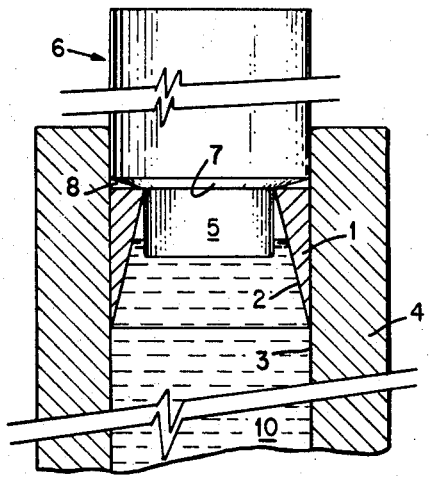
FIG. 1 is a vertical section of a high temperature sealing arrangement made in accordance with the present invention.

In order to facilitate an understanding of the invention, reference is made to FIG. 1 of the drawings wherein a high temperature sealing arrangement made in accordance with the present invention is illustrated. A sealing member 1 is consructed of soft copper or other soft ductile metal. Sealing member 1 is an annular solid which may be substantially duplicated in shape by revolving a right triangular shape about an axis of revolution. The right triangle has a base lying in a plane normal to the axis of revolution and a hypotenuse facing the axis. In practice the angle of the triangular section subtending its hypotenuse is slightly greater than 90° but less than 91° inasmuch as the outer diameter of extremity 2 of sealing member 1 is slightly greater (−3 mils) than its outer base diameter. The larger diameter of extremity 2 provides an interference fit (−3 mils) between the outer surface of the extremity and the inside face 3 of die 4. A central post 5 extends from piston 6 through the center of sealing member 1 to position and hold it. A tapered shoulder 7 is provided between the base of post 5 and the outside diameter of piston 6.

An annular space 8 of triangular cross section is provided between the base of sealing member 1 and shoulder 7 of piston 6. A 10° taper on shoulder 7 has been found to be satisfactory when using metal sealing members such as shown in FIG. 1.

During a pressing operation, piston 6 is advanced into die 4 causing a gradual pressure increase in pressure chamber 10. Initial sealing is provided at low pressure by a slight interference between the thin extremity 2 of sealing member 1 and inside face 3 of die 4. It is essential to the invention that this initial seal be developed so that as the pressure in chamber 10 increases, it causes the thin sealing member 1 to increasingly deform against the face 3 beginning at extremity 2. As the piston 6 advances further into chamber 10 and design pressure is approached, sealing member 1 extrudes outwardly against face 3 in a sealing relationship, partially filling annular space 8. Space 8 permits some extrusion of sealing member 1 against face 3 of die 4 to provide a good seal while preventing sealing member 1 from being extruded between piston 6 and die 4. Such extrusion between the piston and die is highly undesirable in that it jams the piston in the cylinder and makes its later withdrawal very difficult.

Post 5 illustrated in FIG. 1 could be removed and sealing member 1 provided with a closed base as an alternative embodiment.

Tests using soft copper sealing members and constructed substantially in accordance with the sealing arrangement illustrated in FIG. 1 have been run at pressures exceeding 135,000 p.s.i. and temperatures exceeding 600° F. without seal failure. Hercoflex 600 and glycerol were used as pressure transmitting mediums in those tests.

Figure 2:
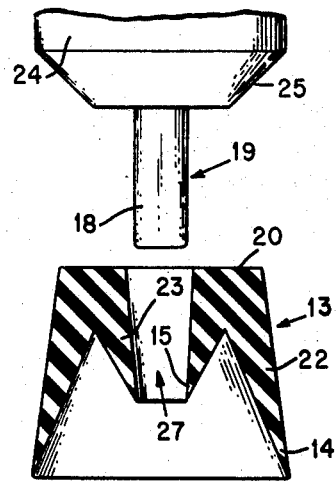
FIG. 2 is a vertical section of a disassembled sealing arrangement designed in accordance with the invention for lower temperature applications than the arrangement of FIG. 1.
Figure 3:
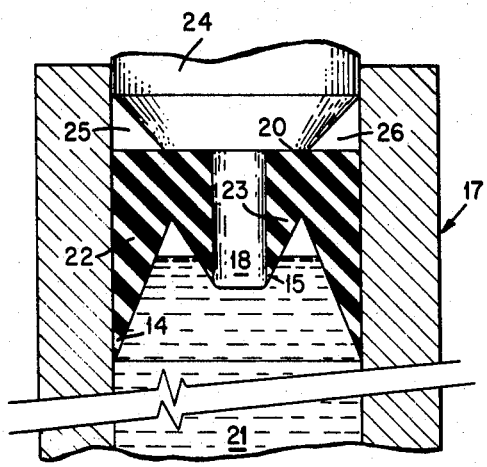
FIG. 3 illustrates the arrangement of FIG. 2 after assembly.

The sealing arrangement illustrated in FIGS. 2 and 3 is for lower temperature applications than the metal seal arrangement of FIG. 1. A sealing member 13 is constructed of a soft tough elastomer having a hardness in the range from about 40 to about 60 durameters. Polyvinyl chloride (Unichrome) has been found satisfactory as an elastomer for use in sealing members 13. As shown in the disassembled view of FIG. 2, sealing member 13 is an annular solid which may be duplicated in shape by revolving a cross section about an axis of revolution. The cross section revolved is that shown in FIGS. 2 and 3 and may be approximated by two partially overlapping right triangular sections having bases which lie in a common plane normal to the axis of revolution. The outer triangular section, which is farther away from the axis of revolution, has a hypotenuse facing toward the axis of revolution while the inner triangular section has a hypotenuse facing away from the axis of revolution. The surface formed by revolving the hypotenuse of the outer triangular section intersects that surface formed by the hypotenuse of the inner triangular section at an intermediate point due to the overlap of the two triangular sections.

Although the inner and outer triangular sections have been approximated by two right triangular sections, actually the angles subtending the hypotenuse of each of the triangular sections is slightly greater than 90° although ordinarily less than 91°. This slightly obtuse angle is necessary because of the requirement in the present invention that sharp edged extremities 14 and 15 be in slight interference with inside face 16 of die 17 and outside face 18 of post 19. Five to ten mils interference have been found satisfactory for the extremities while little or no interference is needed with faces 16 or 17 near the base 20 of sealing member 13. The slightly obtuse angles and interference fit of sealing member 13 are shown exaggerated in FIG. 2 for illustrative purposes.

During a pressing operation, as illustrated in FIG. 3, the initial interference fits between extremities 14 and 15 and faces 16 and 18, respectively, ensure an initial seal before pressure is generated in pressure chamber 21. As the pressure in chamber 21 increases, the pressure differential across upstanding lips 22 and 23 causes them to deform outwardly against faces 16 and 18, respectively. The pressure in chamber 21 in effect aids the sealing member 13 in maintaining a seal by forcing upstanding lips 22 and 23 against faces 16 and 18 with a pressure proportional to the pressure in chamber 21. The seals developed between sealing member 13 and faces 16 and 18 are thus tailored to the pressure in chamber 21 which must be sealed against as it is that pressure which deforms lips 22 and 23 and enables them to maintain a seal. Increasing pressure in chamber 21 causes a corresponding increase in the pressure exerted against faces 16 and 18 by lips 22 and 23. It can be seen, accordingly, that the seal developed by the present invention is not dependent upon a large interference fit with all its attendant disadvantages. The slight interference fit of extremities 14 and 15 is needed only to initiate the seal which is then maintained by and tailored to the pressure in chamber 21.

Sealing member 13 must be used in combination with a piston 24 having a tapered shoulder 25. Shoulder 25 provides an annular space 26 which permits sealing member 13 to deform at pressure against face 16 of die 17 without extruding between piston 24 and face 16. Such extrusion, which occurs in the absence of space 26, tends to increase the force necessary to drive piston 24 into chamber 21 as well as increasing the force necessary to withdraw the piston following a pressing operation. In addition, extrusion of the sealing member between the piston and inner die face tends to destroy the sealing member, rendering it unusable for subsequent pressing operations. With the present sealing member 13 and piston 24, sealing member 13 simply returns to its initial shape following a pressing operation, leaving only the slight initial interference provided between extremity 22 and face 16 to be overcome in withdrawing the piston. A shoulder having a 45 degree taper has been found satisfactory for use with Unichrome seals.

Post 19 extending from piston 24 is provided to facilitate initial insertion of sealing member 13 into a die 17 without encountering resistance due to air pressure developing within chamber 21. A central penetration 27 through sealing member 13 enables air to escape from chamber 21 as the sealing member is advanced therein. After the sealing member is advanced to a point where the liquid pressing medium rises through penetration 27, piston 24 and post 19 are inserted into the die and post 19 passed through penetration 27 where it is engaged in an interference fit by lip 23. In addition to the problem of inserting sealing members into a die where no means of escape are provided for air contained therein, a very hazardous condition exists following a pressing operation where air is present in other than very small amounts. Under such conditions the highly compressed air has been known to propel the piston out of the die with explosive force.

Withdrawal of pistons fitted with elastomer sealing members similar to the embodiment of FIGS. 2 and 3 is readily accomplished upon completion of a pressing operation. Pistons fitted with Unichrome seals have been found to fall out of the die by force of gravity alone upon release of pressing force against the piston and inversion of the die.

Sealing arrangements using Unichrome sealing members similar to that illustrated in FIGS. 2 and 3 have been tested to 200,000 p.s.i. at room temperature and to 40,000 p.s.i. at 300° F. without seal failure. Hercoflex 600 was used as a pressure transmitting medium in those tests.

What is claimed is:
1. In a piston-cylinder type pressure vessel comprising an annular female die having an inner cylindrical surface defining a pressure chamber, and a piston having a free end slidably engaging said inner surface of said die along its lateral surface, wherein advancement of said piston into said die increases the pressure within said pressure chamber; the improved sealing arrangement comprising a soft-ductile-metal sealing member disposed on said free end of said piston, said sealing member comprising an upstanding annular lip of substantially triangular cross section, said annular lip having a base contiguous with said free end of said piston and a terminal edge subtending said base, said terminal edge engaging said inner surface of said die in an interference fit prior to a pressing operation, said base of said lip, inner surface of said die, and free end of said piston defining an annular space of substantially triangular cross section prior to the commencement of a pressing operation, said sealing member deforming into said annular space and against said inner surface during a pressing operation.

2. The sealing arrangement of claim 1 wherein said sealing member is constructed of soft copper and wherein said free end of said piston is tapered about 10 degrees adjacent said base of said annular lip.

References Cited

UNITED STATES PATENTS

| | | | |
|---|---|---|---|
| 1,091,387 | 3/1914 | Pierce | 277—212 X |
| 1,159,066 | 11/1915 | Moore | 277—212 X |
| 2,111,312 | 3/1938 | Clark | 92—245 |
| 2,139,387 | 12/1938 | Schweiss | 92—240 |
| 2,445,057 | 7/1948 | Driscoll | 92—240 |
| 2,459,395 | 1/1949 | Smith | 277—216 |
| 2,549,818 | 4/1951 | Joy | 92—244 X |
| 2,686,402 | 8/1954 | Samuel | 92—240 |
| 2,862,775 | 12/1958 | Kupiec | 92—246 |
| 2,984,529 | 5/1961 | Dailey | 92—243 X |
| 3,037,781 | 6/1962 | Peras | 277—212 X |

OTHER REFERENCES

Machine Design, Plastics Issue, vol. 38, No. 14, June 16, 1966, pp. 95–97.

CARROLL B. DORITY, JR., *Primary Examiner.*

U.S. Cl. X.R.

277—212, 236; 29—156.5; 92—224, 247